C. G. OLIN.
EXERCISING DEVICE FOR HORSES.
APPLICATION FILED AUG. 7, 1911.
1,062,495.
Patented May 20, 1913.
2 SHEETS—SHEET 2.
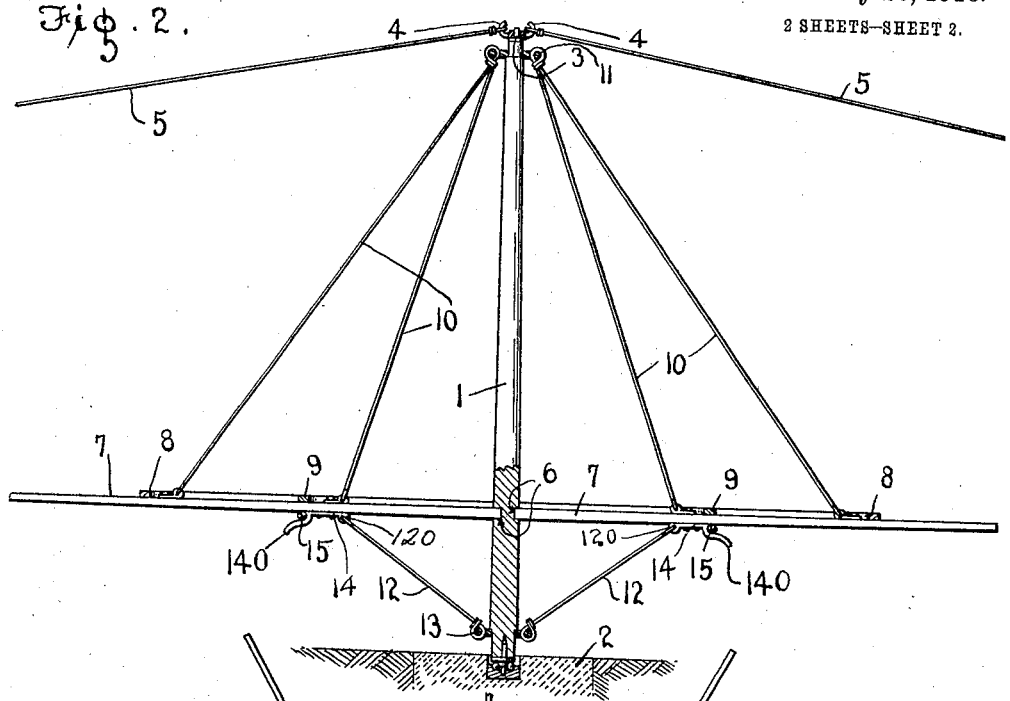
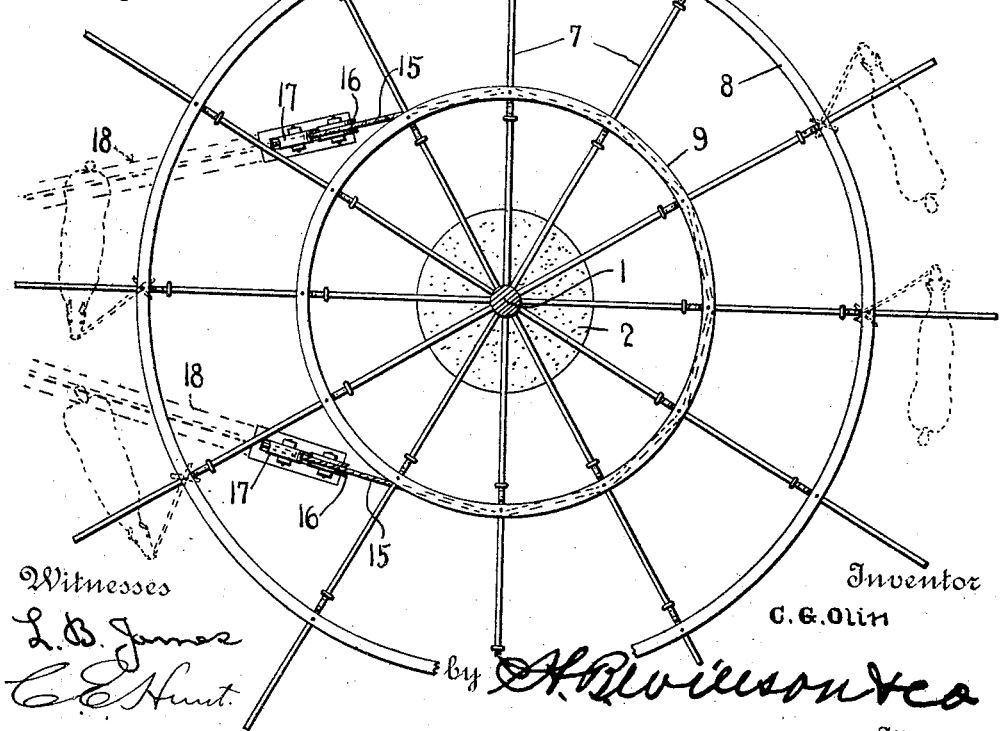

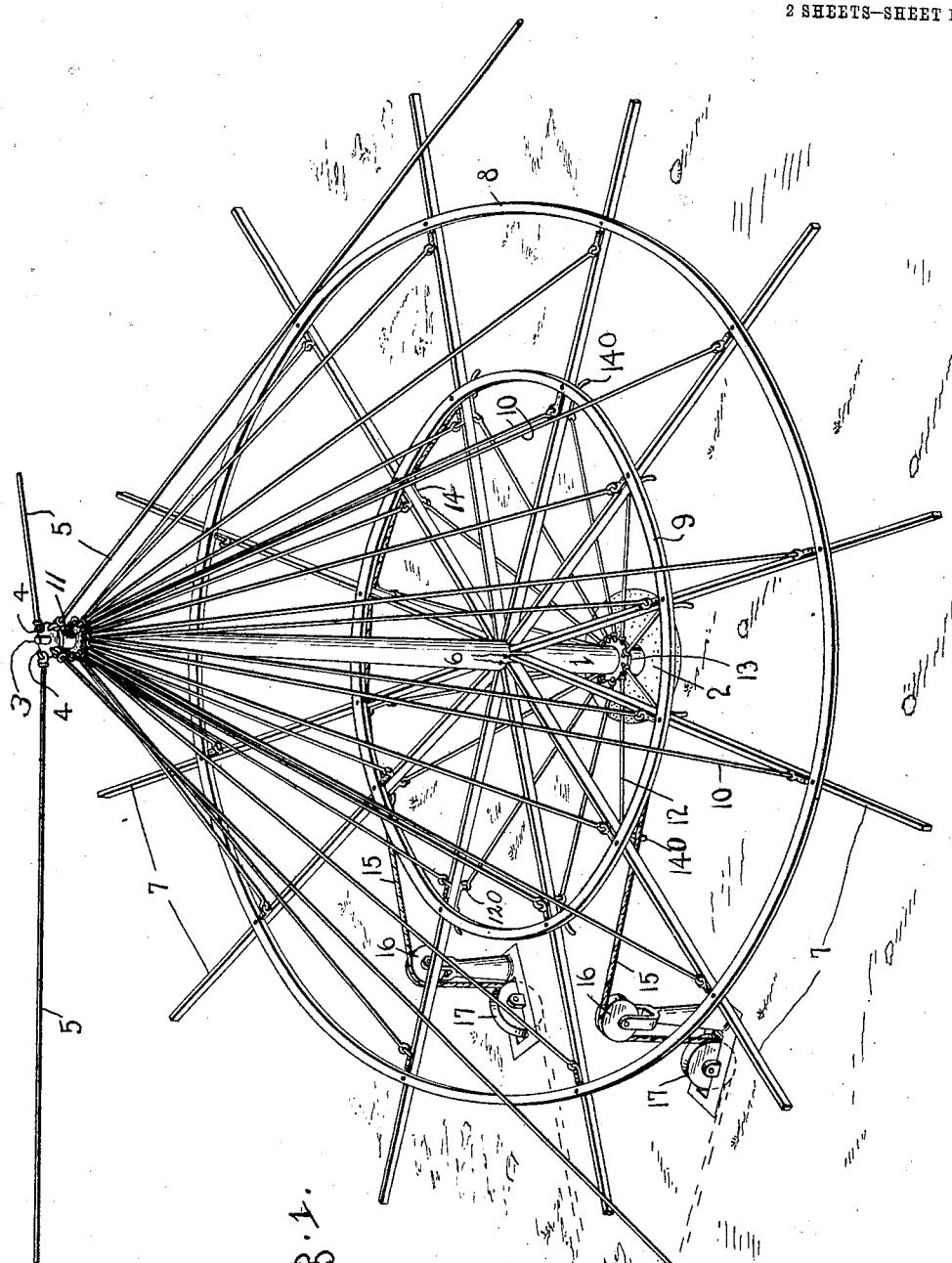

UNITED STATES PATENT OFFICE.

CLARENCE GRANT OLIN, OF WINDSOR, OHIO.

EXERCISING DEVICE FOR HORSES.

1,062,495.  Specification of Letters Patent.  Patented May 20, 1913.

Application filed August 7, 1911. Serial No. 642,595.

*To all whom it may concern:*

Be it known that I, CLARENCE GRANT OLIN, a citizen of the United States, residing at Windsor, in the county of Ashtabula and State of Ohio, have invented certain new and useful Improvements in Exercising Devices for Horses; and I do declare the following to be a full, clear, and exact description of the invention, such as will enable others skilled in the art to which it appertains to make and use the same.

This invention relates to improvements in exercising devices for horses.

One object of the invention is to provide an exercising device or apparatus of this character which is particularly adapted for exercising race horses after a "work-out" or race and whereby a number of horses may be steadily and continuously walked or led at the proper speed for any desired length of time.

Another object is to provide an improved means for applying power to the device whereby the same may be operated at the proper speed without interfering with the movement of the horses tethered thereto.

A further and important object of the invention is in the provision of a series of radially projecting sweeps forming individual movable stalls which are open from the outer portion of the device, the spaces between the said sweeps only accommodating a single animal and allowing the latter perfect freedom of the body when the device is in operation.

With these and other objects in view the invention consists of certain novel features of construction and the combination and arrangement of parts as will be more fully described and claimed.

In the accompanying drawings: Figure 1 is a perspective view of my improved exercising device; Fig. 2 is a central vertical section of a portion of the same; Fig. 3 is a horizontal sectional view on a plane just above the sweeps.

In the embodiment of the invention I provide a centrally disposed supporting shaft or mast 1 the lower end of which is revolubly mounted in a suitable base 2 which is preferably constructed of concrete and set into the ground. The lower end of the shaft or mast preferably has a ball bearing engagement with the base whereby the former will readily revolve when the device is operated in the manner hereinafter described. In the upper end of the mast is arranged a pivot pin with which is loosely engaged a pivot plate gudgeon 3 having formed thereon a series of hooks 4 to which are connected the upper ends of a series of guy ropes or cables 5 the outer ends of which are connected to any suitable fixed or stationary supports such as trees, buildings or stakes set in the ground.

The shaft or mast 1 preferably tapers from its lower toward its upper end and has formed therein a suitable distance above its lower end a series of radial vertically disposed notches or mortises 6 with which are engaged the tenoned inner ends of a series of spokes or radially projecting sweeps 7. The spokes 7 may be of any suitable length and are connected together near their outer ends by an outer bracing ring 8 and intermediate of their ends by an inner bracing ring 9 said rings 8 and 9 being bolted or otherwise secured to the sweeps or spokes as shown. The sweeps or spokes are further braced by a series of inclined brace rods 10 the outer or lower ends of the alternate ones of which are connected to the sweeps near the points where the inner ring 9 engages the same while the remaining rods are secured adjacent to the ring 8 while the upper inner ends of all of the brace rods 10 are connected to a ring or band 11 secured to the mast or shaft 1 near its upper end. Co-acting with the brace rods 10 to form an additional support for the sweeps 7 are a series of lower inclined brace rods 12 the outer ends of which are secured in eyes 120 of brackets 14 secured to the under side of the sweeps below the point of connection therewith of the upper rods 10. The inner ends of the rods 12 are connected to a ring or band 13 secured to the mast near its lower end. The sweeps 7 preferably taper from their inner ends toward their outer ends as shown.

In order to revolve or operate the mast 1 and sweeps 7 I provide a suitable driving mechanism comprising the supporting brackets 14 one of which is secured to the lower side of each of the sweeps 7 preferably at a point opposite to the connection of the inner brace rods with said arms. With the hooks 140 of the brackets 14 is preferably engaged an endless driving belt or cable 15 which after leaving the hooks passes over suitably mounted guide pulleys 16 and 17 and from the pulleys 17 passes through under ground conduits 18 and is operatively connected with any suitable form of motor whereby the belt or cable is driven and the movement of the motor thus communicated to the exercising apparatus to revolve the same at the proper speed for exercising the horses tethered thereto. The hooks 140 are constructed in such a manner as to form cleats which are of sufficient length to thoroughly strengthen the portions of the sweeps 7 where the brace wires 10 and 12 connect, thereby giving strength and rigidity to the entire structure. The horses are tied or tethered to suitable attaching rings or eyes on the outer ends of the sweeps 7 so that the horses walk between the projecting ends of the sweeps adjacent to the outside of the outer ring 8.

As clearly shown the distance between the radially projecting sweeps 7 are such as to provide movable stalls each of which is adapted to freely receive only one animal and when the animals are properly haltered to the outer ring 8 adjacent the connected sweeps, one animal is prevented from crowding the other, said sweeps being located a suitable distance from the ground and allowing the animals free movement of their bodies during the rotation of the device. It is further to be noted that the outer ring 8 which forms the inner curved side walls of the stalls are such as to provide a smooth curved riding surface adjacent to one side of the animal, and thereby prevent any possible injury or discomfort to said animal when its body is in contact with said ring. In Fig. 3 the horses or other animals are shown in dotted lines and the device at rest, and when the latter is in operation the said animals will be located between the sweeps 7 with their heads above the same.

From the foregoing description taken in connection with the accompanying drawings, the construction and operation of the invention will be readily understood without requiring a more extended explanation.

Having thus described my invention, what I claim is:

An exercising device comprising a revoluble mast with sweeps having their inner ends connected thereto adjacent to the lower end thereof, the upper end of the mast being reduced and having a pivot pin projecting therefrom, a plate loosely mounted upon the upper reduced end of the mast and held in position by the pin projecting therefrom, said plate having a plurality of hooks projecting upwardly therefrom, guy ropes or cables, one end of which is detachably connected to the hooks of the plate and having their opposite ends properly anchored beyond the free ends of the sweeps, a ring secured to the mast below said plate, brace rods having their upper ends connected to the ring and their lower ends spaced from each other and secured to the sweeps, cleats secured to the under surfaces of the sweeps and provided with hooks, short brace rods secured to one end of the cleats opposite the hooks thereof and having their opposite ends attached to the mast adjacent to the lower end thereof, the brace rods to the sweeps being oppositely disposed, two rings of different diameters secured to the upper surface of the sweeps and located adjacent to the connecting ends of the braces to said sweeps, whereby the parts are rigidly connected, an endless cable passing over the hooked ends of the cleats, and a plurality of pulleys located between and below the rings over which the cable passes, the free ends of the sweeps extending a considerable distance beyond the outer ring of the device for the purpose described.

In testimony whereof I have hereunto set my hand in presence of two subscribing witnesses.

CLARENCE GRANT OLIN.

Witnesses:
ALMON C. BROCKWAY,
VERGNE L. FORTNEY.

---

Copies of this patent may be obtained for five cents each, by addressing the "Commissioner of Patents. Washington, D. C."